United States Patent
Sung et al.

(10) Patent No.: US 11,670,981 B2
(45) Date of Patent: Jun. 6, 2023

(54) MOTOR WITH A REFRIGERANT SUPPLY GROOVE IN A HOUSING

(71) Applicant: LG Magna e-Powertrain Co., Ltd.

(72) Inventors: Wonjung Sung, Seoul (KR); Jaemin Kim, Seoul (KR); Gyeongjae Park, Seoul (KR); Jeongmin Lee, Seoul (KR)

(73) Assignee: LG MAGNA E-POWERTRAIN CO., LTD., Incheon (KR)

(*) Notice: Subject to any disclaimer, the term of this patent is extended or adjusted under 35 U.S.C. 154(b) by 206 days.

(21) Appl. No.: 17/135,276

(22) Filed: Dec. 28, 2020

(65) Prior Publication Data

US 2021/0313858 A1   Oct. 7, 2021

(30) Foreign Application Priority Data

Apr. 3, 2020 (KR) .................. 10-2020-0040992

(51) Int. Cl.
*H02K 5/20* (2006.01)
*H02K 9/193* (2006.01)
*H02K 1/20* (2006.01)

(52) U.S. Cl.
CPC .............. *H02K 5/203* (2021.01); *H02K 9/193* (2013.01); *H02K 1/20* (2013.01)

(58) Field of Classification Search
CPC .............. H02K 5/20; H02K 5/203; H02K 1/20
(Continued)

(56) References Cited

U.S. PATENT DOCUMENTS

| 3,531,668 A | 9/1970 | Cathey |
| 8,482,173 B2* | 7/2013 | Wright .................... F04D 13/06 310/90 |

(Continued)

FOREIGN PATENT DOCUMENTS

| CN | 201355790 Y | 12/2009 |
| CN | 204906112 | 12/2015 |

(Continued)

OTHER PUBLICATIONS

Kuroda (JP 2017093002 A) English Translation (Year: 2017).*

(Continued)

*Primary Examiner* — Tulsidas C Patel
*Assistant Examiner* — Robert E Mates
(74) *Attorney, Agent, or Firm* — Birch, Stewart, Kolasch & Birch, LLP

(57) ABSTRACT

A motor according to an embodiment of the present disclosure may include a housing comprising an accommodation space and a refrigerant supply hole; a stator core disposed in the accommodation space and coupled to an inner circumferential surface of the housing; a rotor core rotatably disposed in the accommodation space; a shaft coupled to a central portion of the rotor core; and a refrigerant supply groove formed as a recess in a portion of the inner circumferential surface of the housing adjacent to a location where the inner circumferential surface of the housing is coupled to the stator core. The refrigerant supply groove may comprise a main groove communicating with the refrigerant supply hole and extending in a circumferential direction of the stator core; and a plurality of branched grooves extending in an axial direction from both sides of the main groove.

18 Claims, 9 Drawing Sheets

(58) Field of Classification Search
USPC .................. 310/216.114, 400, 405, 406, 408
See application file for complete search history.

(56) References Cited

U.S. PATENT DOCUMENTS

2016/0164377 A1    6/2016  Gauthier et al.
2019/0285144 A1*   9/2019  Yamagishi .............. F16H 57/02

FOREIGN PATENT DOCUMENTS

| CN | 107276266 A | * | 10/2017 | .............. H02K 1/20 |
| JP | 2003-324901 A | | 11/2003 | |
| JP | 2014-225969 A | | 12/2014 | |
| JP | 2017-093002 A | | 5/2017 | |
| JP | 2017093002 A | * | 5/2017 | |
| KR | 10-2012-0058336 A | | 6/2012 | |

OTHER PUBLICATIONS

Fan (CN 107276266 A) English Translation (Year: 2017).*
European Search Report issued in EP Application No. 20212653.8-1201, dated May 18, 2021 (12 pages).

* cited by examiner

MOTOR WITH A REFRIGERANT SUPPLY GROOVE IN A HOUSING

CROSS-REFERENCE TO RELATED APPLICATION

Pursuant to 35 U.S.C. § 119(a), this application claims the benefit of the earlier filing date and the right of priority to Korean Patent Application No. 10-2020-0040992, filed on Apr. 3, 2020, the contents of which are incorporated by reference herein in their entirety.

BACKGROUND

1. Technical Field

The present disclosure relates to a motor, and more particularly, to a motor having a structure in which a flow path through which refrigerant flows is formed in an inner wall of a housing.

2. Description of the Related Art

A motor is a device that converts electrical energy into mechanical energy, and is used as a driving source for various home appliances, electric vehicles, and hybrid vehicles including internal combustion engines, and the likes.

As is well known, the motor includes a stator core, a stator coil, a rotor core, and a rotation shaft, and is operated by electric power applied to the stator coil.

Energy loss occurs in a process of converting electrical energy into mechanical energy, and energy loss is exhibited mainly in a form of heat energy.

When a temperature inside the motor rises excessively as heat is generated, irreversible demagnetization of permanent magnets that may be included in the rotor may occur, and an efficiency of the motor may decrease or the motor may stop due to excessive heating of the stator coil.

As one of causes of heat generation, heat is generated while current flows through the stator coil. In particular, excessive heat may be generated at a portion where the stator coils are curved to be bent or the stator coils are coupled to each other.

The prior art document 1 (Chinese Patent Publication CN 204906112 U) discloses a motor cooled by refrigerant.

The motor disclosed in the prior art document 1 has a structure in which refrigerant is moved through flow paths formed through the stator core in an axial direction.

Accordingly, the motor may have a problem in that a magnetic path area is reduced and a size of the stator core is increased in a radial direction.

In addition, since an additional component for distributing the refrigerant to each of the plurality of flow paths is needed, a manufacturing and assembling process may be complicated and a manufacturing cost may increase.

SUMMARY

The present disclosure is directed to providing a motor having a structure capable of solving the above problems.

Firstly, an aspect of the present disclosure is to provide a motor having a structure capable of smoothly supplying refrigerant to both end portions of a stator core in an axial direction.

Another aspect of the present disclosure is to provide a motor having a structure capable of smoothly supplying refrigerant to both end portions of a stator core without increasing a size of the stator core.

Another aspect of the present disclosure is to provide a motor having a structure capable of distributing refrigerant in a circumferential direction of a stator core without adding additional components.

Another aspect of the present disclosure is to provide a motor having a structure capable of spraying refrigerant moved to both end portions of a stator core toward a shaft.

In order to achieve the above aspects, a motor according to an embodiment of the present disclosure includes a housing in which a stator core is coupled to an inner circumferential surface of the housing.

Between the stator core and the inner circumferential surface of the housing, a main flow path, which is a path through which refrigerant moves in a circumferential direction of the stator core, is formed.

In addition, between the stator core and the inner circumferential surface of the housing, branched flow paths, which are paths through which refrigerant moves in an axial direction of the stator core, are formed.

Further, the branched flow paths communicate with the main flow path.

In addition, a main groove is formed in an inner circumferential surface of the housing, and the main groove extends in the circumferential direction of the stator core.

In addition, branched grooves are recessed in the inner circumferential surface of the housing, and the branched grooves extend in the axial direction of the stator core.

In addition, the main flow path is a space between the main groove and the inner circumferential surface of the housing facing the main groove, and the branched flow path is a space between the branched groove and the inner circumferential surface of the housing facing the branched groove.

In addition, a motor according to an embodiment of the present disclosure includes a housing provided with an accommodation space therein, and provided with a refrigerant supply hole formed through an outer circumferential surface thereof in a radial direction, a stator core disposed in the accommodation space and coupled to an inner circumferential surface of the housing, stator coils wound around the stator core, a rotor core rotatably disposed and spaced apart from an inner circumferential surface of the stator core by a predetermined distance, and a shaft coupled through a central portion of the rotor core.

In addition, a refrigerant supply groove is recessed from a portion of the inner circumferential surface of the housing where the inner circumferential surface of the housing is coupled to the stator core.

In addition, the refrigerant supply groove includes a main groove communicating with the refrigerant supply hole and extending in a circumferential direction of the stator core, and branched grooves extending in an axial direction at both sides of the main groove and communicating with the main groove.

In addition, the main groove and the inner circumferential surface of the housing facing the main groove form a main flow path that is a path through which refrigerant introduced through the refrigerant supply hole flows.

In addition, the branched grooves and the inner circumferential surface of the housing facing the branched grooves form branched flow paths that are paths through which the refrigerant from the main flow path branches into both sides in the axial direction of the stator core.

In addition, the branched grooves are formed in plural in the circumferential direction of the stator core, the main groove has a predetermined width in the axial direction, and a portion in the main groove, where branched grooves adjacent to each other are connected in the circumferential direction, is provided with a bottleneck portion having a narrower width.

Further, the main groove has a predetermined width in the axial direction, and the branched grooves each has a predetermined length in the axial direction.

In addition, a value obtained by adding a value of the axial width of the main groove to a sum of the axial lengths of the branched grooves located at both sides of the main groove is greater than a value of an axial length of the stator core.

In addition, the main groove and the inner circumferential surface of the housing facing the main groove form a main flow path that is a path through which refrigerant introduced through the refrigerant supply hole flows, portions of the branched grooves overlapping the inner circumferential surface of the housing in a radial direction form branched flow paths together with the inner circumferential surface of the housing, and the refrigerant moved through the branched flow paths is discharged into the accommodation space through portions of the branched grooves that are open toward the accommodation space. In addition, the inner circumferential surface of the housing is provided with refrigerant dispersion surfaces disposed at end portions of the branched grooves, and the branched grooves overlap the refrigerant dispersion surfaces in the axial direction.

In addition, the refrigerant dispersion surfaces are formed to be inclined in a direction away from the main groove.

In addition, the inner circumferential surface of the housing is provided with refrigerant dispersion grooves formed to be recessed and connected to the end portions of the branched grooves.

In addition, each of the refrigerant dispersion grooves is formed in a quarter-sphere shape open toward the branched grooves and the shaft.

In addition, the housing includes a main housing with both sides thereof open, and covers each coupled to each side of the main housing.

In addition, each of the covers is provided with a protruding coupling portion protruding toward the main housing to be engaged with an inner circumferential surface of the open portion of the main housing, and the refrigerant dispersion surfaces are formed at end portions of the protruding coupling portions.

In addition, the housing includes a main housing with both sides thereof open, and covers each coupled to each side of the main housing. Each of the covers is provided with a protruding coupling portion protruding toward the main housing to be engaged with an inner circumferential surface of the open portion of the main housing, and the refrigerant dispersion grooves are formed at end portions of the protruding coupling portions.

In addition, the outer circumferential surface of the housing is provided with a base portion formed to protrude outwardly and having a refrigerant storage space therein.

In addition, a portion of the housing facing the base portion is partly open toward the refrigerant storage space, the refrigerant storage space and the accommodation space communicate with each other, and the base portion is provided with a refrigerant discharge hole through which refrigerant introduced into the refrigerant storage space is discharged.

In addition, an axial length of the base portion is formed longer than the stator core, and a portion of the housing where the base portion is formed is provided with through holes communicating the refrigerant storage space and the accommodation space.

In addition, the through hole is formed in plural, and the plurality of through holes is disposed at both sides of the main groove.

In addition, the accommodation space includes a first accommodation space disposed at one side of the stator core, and a second accommodation space disposed at another side opposite to the one side of the stator core.

In addition, the through hole is formed in plural. One of the plurality of through holes communicates the first accommodation space and the refrigerant storage space, and another one of the plurality of through holes communicates the second accommodation space and the refrigerant storage space. And a bridge portion forming a part of the main groove is provided between the one of the plurality of through holes and the another one of the plurality of through holes.

In addition, a motor according to an embodiment of the present disclosure includes a housing provided with an accommodation space therein, and provided with a refrigerant supply hole formed through an outer circumferential surface thereof in a radial direction, a stator core disposed in the accommodation space and coupled to an inner circumferential surface of the housing, stator coils wound around the stator core, a rotor core rotatably disposed and spaced apart from an inner circumferential surface of the stator core by a predetermined distance, and a shaft coupled through a central portion of the rotor core.

In addition, a refrigerant supply flow path is formed between the inner circumferential surface of the housing and the stator core.

In addition, the refrigerant supply flow path includes a main flow path communicating with the refrigerant supply hole and extending in a circumferential direction of the stator core, and branched flow paths extending in an axial direction at both sides of the main flow path and communicating with the main flow path.

In addition, a refrigerant supply groove is recessed from a portion of the inner circumferential surface of the housing where the inner circumferential surface of the housing is coupled to the stator core. The refrigerant supply groove includes a main groove communicating with the refrigerant supply hole and extending in a circumferential direction of the stator core, and branched grooves extending in an axial direction at both sides of the main groove and communicating with the main groove.

In addition, the main flow path is formed by the main groove and the inner circumferential surface of the housing facing the main groove, and the branched flow paths are formed by the branched grooves and the inner circumferential surface of the housing facing the branched grooves.

According to an embodiment of the present disclosure, the following effects can be achieved.

Firstly, a housing in which a stator core is coupled to an inner circumferential surface of the housing, and a circumferential flow path through which refrigerant moves in a circumferential direction of the stator core is formed between the housing and the stator core.

In addition, axial flow paths that communicate with the circumferential flow path and through which refrigerant moves in an axial direction of the stator core are formed between the housing and the stator core.

Accordingly, the refrigerant can be smoothly supplied to both end portions of the stator core through the circumferential flow path and the axial flow paths.

Thereby, both end portions of the stator core, which is one of the main heat sources of the motor, can be smoothly cooled.

Therefore, an excessive increase in an internal temperature of the motor can be suppressed.

In addition, the circumferential flow path and the axial flow paths are formed in a space between grooves formed on the inner circumferential surface of the housing and an outer circumferential surface of the stator core.

Accordingly, refrigerant can be smoothly supplied to both end portions of the stator core without a separate processing for forming flow paths in the stator core or adding separate components for distributing refrigerant to the stator core.

Thereby, refrigerant can be smoothly supplied to both end portions of the stator core without increasing a size of the stator core to form a flow path to supply refrigerant or adding separate components.

As a result, while refrigerant is smoothly supplied to both end portions of the stator core, the motor is miniaturized and the assembly process of the motor is simplified, thereby reducing manufacturing cost of the motor.

In addition, a refrigerant dispersion structure to spray refrigerant toward a center of a shaft is formed at each of end portions of the axial flow paths.

Accordingly, the refrigerant moved through the axial flow paths may collide with the refrigerant dispersion structure to be sprayed toward the center of the shaft.

Therefore, the refrigerant can be sprayed toward a crown portion and an end turn of the stator coils located at both end portions of the stator core.

Therefore, areas of portions of outer circumferential surfaces of the crown portion and the end turn in contact with the sprayed refrigerant may be increased.

As a result, heat exchange between the stator coils and the refrigerant can be performed more smoothly.

DETAILED DESCRIPTION

Figure 1:
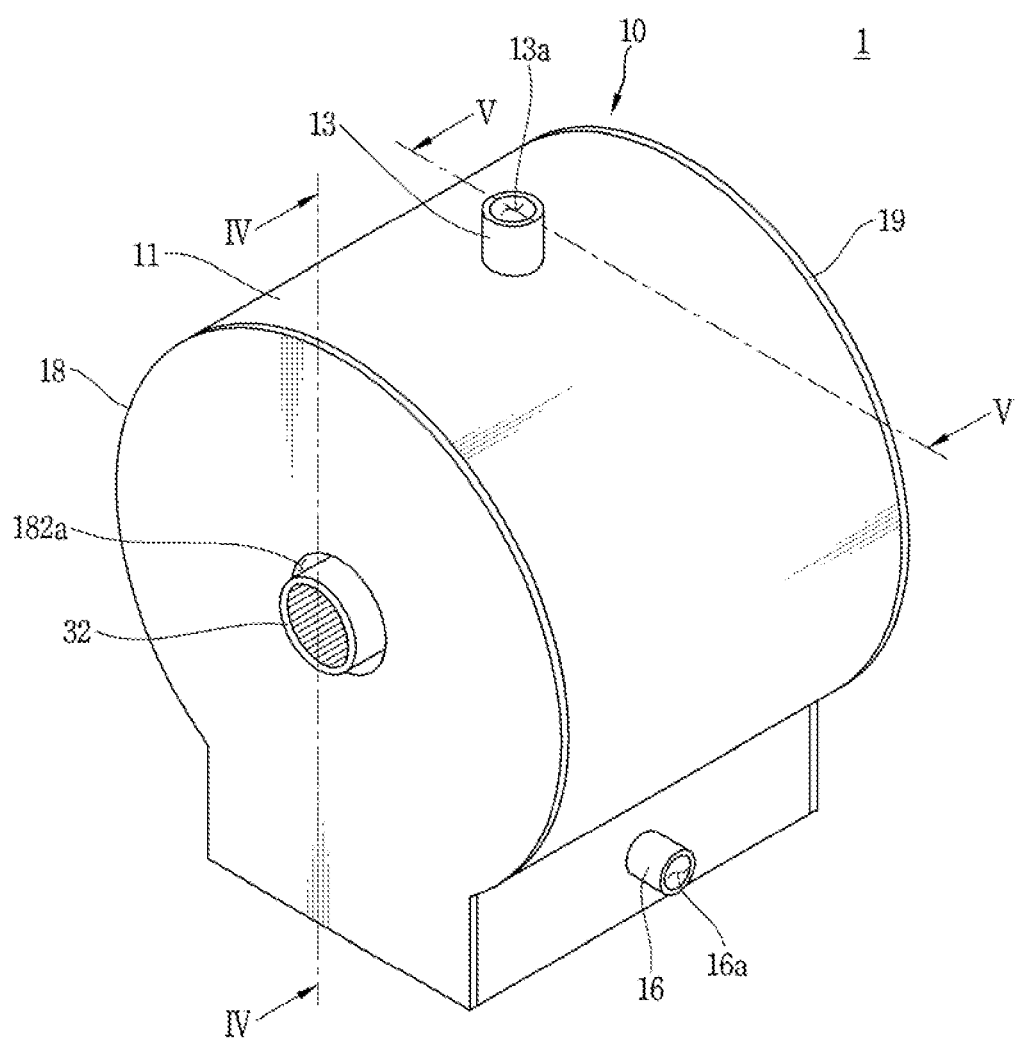
FIG. 1 is a perspective view of a motor in accordance with an embodiment.

Hereinafter, description will be given in detail of a motor in accordance with an embodiment disclosed herein, with reference to the accompanying drawings.

In the followings, descriptions of several components will be omitted in order to clarify technical features of the present disclosure.

1. Definition of Terms

The term "energization" used in the following description means that one component is electrically connected to another component or is connected to enable information communication. The energization may be implemented by conducting wires, communication cables, or the like.

A term "front side" used in the following description refers to a direction toward a first cover 18, and a term "rear side" refers to a direction toward a second cover 19.

A term "upper side" used in the following description refers to a direction in which a refrigerant supply portion 13 is protruded from a housing 10.

A term "lower side" used in the following description refers to a direction in which a base portion 15 is formed on the housing 10.

2. Description of a Motor 1 According to an Embodiment of the Present Disclosure FIGS. 1 to 4 illustrate a motor 1 that rotates by receiving power from an external power source (not illustrated).

The motor 1 according to an embodiment of the present disclosure includes a housing 10, a stator 20, and a rotor 30.

In addition, although not illustrated, the motor 1 according to this embodiment may include an external power source (not illustrated) and an inverter that converts external power into a three-phase power to drive the motor 1.

In the following, each configuration of the motor 1 will be described in detail.

(1) Description of the Housing 10

Figure 2:
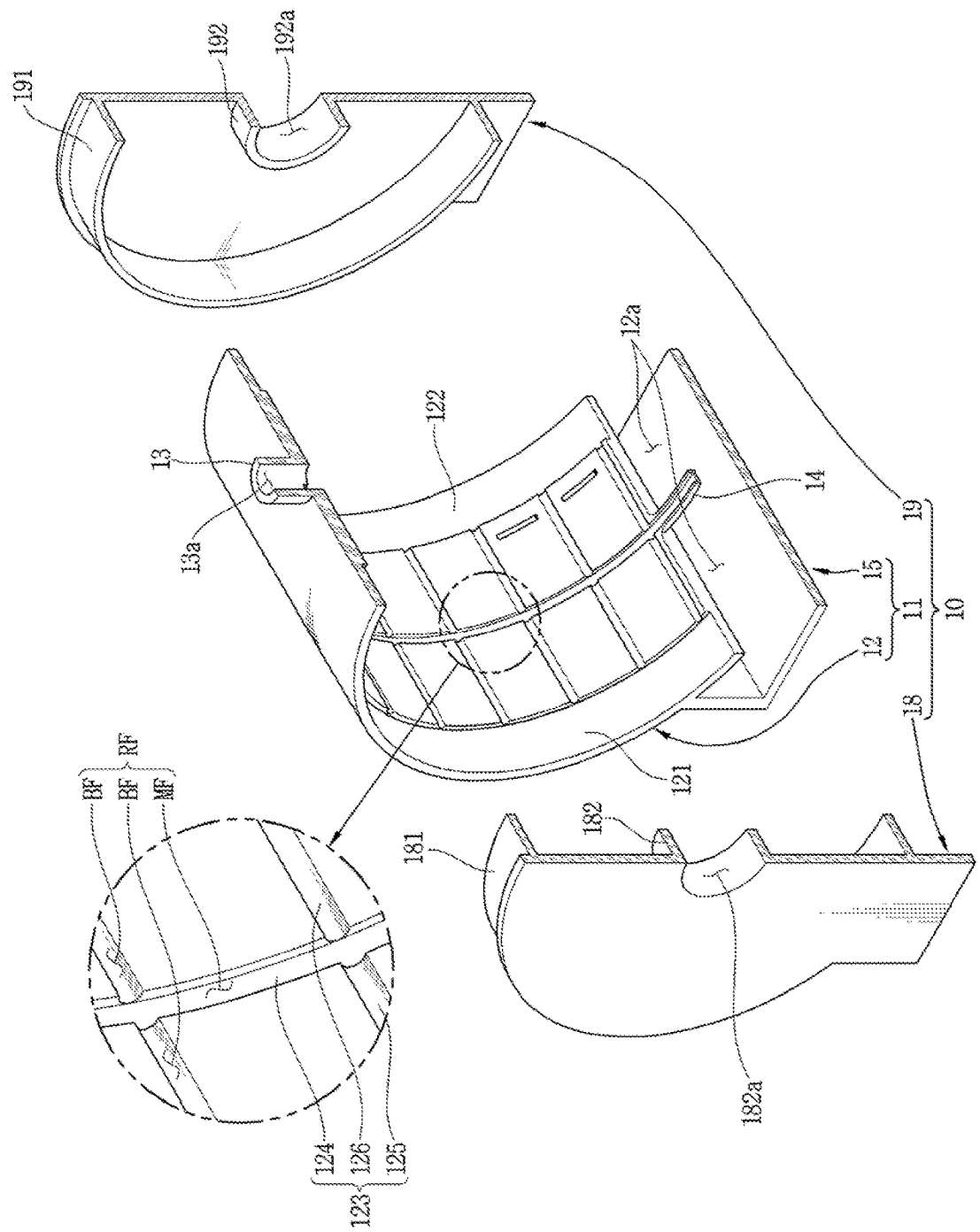
FIG. 2 is a perspective view illustrating a housing according to FIG. 1 after being cut and exploded.

Firstly, the housing 10 will be described with reference to FIGS. 1, 2, and 4. In FIG. 2, the housing 10 is illustrated cut in half.

The housing 10 defines an appearance of the motor 1. In addition, the housing 10 is provided with a predetermined accommodation space V1 in which the stator 20 and the rotor 30 are accommodated, and a refrigerant storage space V2 in which heat-exchanged refrigerant is stored formed therein.

In the illustrated embodiment, the housing 10 includes a main housing 11 with both sides thereof open and first and second covers 18 and 19 covering both open sides of the main housing 11 and coupled to the main housing 11.

However, the embodiment is not limited thereto, and in one embodiment not illustrated, the main housing 11 may be implemented in a form with only one side thereof open. Here, the main housing 11 may be integrally formed with the first cover 18 or the second cover 19.

The main housing 11 includes a main portion 12 formed in a cylindrical shape and a base portion 15 formed at a lower side of an outer circumferential surface of the main portion 12.

The accommodation space V1 is formed by an inner circumferential surface of the main portion 12 and the first and second covers 18 and 19 covering both sides of the main housing 11.

The base portion 15 may be formed in a shape of a square column with an open front side surface, an open rear side surface, and an open upper side surface. The open upper side of the base portion 15 is coupled to the outer circumferential surface of the main portion 12.

The refrigerant storage space V2 is formed by the outer circumferential surface of the main portion 12 and the first and second covers 18 and 19 covering both sides of the base portion 15.

An upper side of the outer circumferential surface of the main portion 12 is provided with a refrigerant supply portion 13 protruding from the housing 10. The refrigerant supply portion 13 is provided with a refrigerant supply hole 13a communicating the accommodation space V1 and an outside of the housing 10 formed therethrough.

The refrigerant supply portion 13 is connected to a refrigerant circulation portion (not illustrated) that supplies refrigerant into an interior of the housing 10, and refrigerant is introduced into the housing 10 through the refrigerant supply hole 13a.

Through holes 12a may be formed at a portion of the main portion 12 where the main portion 12 faces the base portion 15. Accordingly, refrigerant introduced into the main portion 12 to cool the stator 20 and the rotor 30 may be introduced into the refrigerant storage space V2 through the through holes 12a.

One side surface of the base portion 15 is provided with a refrigerant discharge portion 16 protruding therefrom, and the refrigerant discharge portion 16 is provided with a refrigerant discharge hole 16a formed therethrough to communicate the refrigerant storage space V2 and outside of the base portion 15. Accordingly, the refrigerant introduced into the refrigerant storage space V2 may be discharged through the refrigerant discharge hole 16a.

In an embodiment not illustrated, the refrigerant discharge portion 16 may be connected to a refrigerant circulation portion (not illustrated). The refrigerant cooled in a process of circulating the refrigerant circulation portion (not illustrated) is introduced back into the accommodation space V1 through the refrigerant supply portion 13.

A stator core 21 to be described later is coupled to the inner circumferential surface of the main portion 12. In an embodiment, the stator core 21 may be press-fitted to the inner circumferential surface of the main portion 12.

The accommodation space V1 includes a first accommodation space V11 located at a front side of the stator core 21 and a second accommodation space V12 located at a rear side of the stator core 21.

Through hole 12a to communicate the accommodation space V1 and the refrigerant storage space V2 is provided in plural, and the plurality of through holes 12a may be formed at a position corresponding to the first accommodation space V11 and a position corresponding to the second accommodation space V12.

A bridge portion 14 is formed between a through hole 12a formed at the position corresponding to the first accommodation space V11 and a through hole 12a formed at the position corresponding to the second accommodation space V12.

The bridge portion 14 forms a part of a main groove 124. As the bridge portion 14 is formed, the main groove 124 may surround the stator core 21 in a circumferential direction of the stator core 21 without being cut in a middle.

Therefore, refrigerant flowing through the main groove 124 is prevented from being directly introduced into the refrigerant storage space V2 through the through holes 12a.

Refrigerant flowing through the main groove 124 is discharged into the first accommodation space V11 and the second accommodation space V12 through branched grooves 125 and 126 to cool the stator 20 and the rotor 30, then is introduced into the refrigerant storage space V2 through the through holes 12a.

The refrigerant supply portion 13 is formed at a position overlapping the stator core 21 in a radial direction, and a refrigerant supply flow path RF to supply the refrigerant introduced through the refrigerant supply hole 13a into the first accommodation space V11 and the second accommodation space V12 is formed between the inner circumferential surface of the main portion 12 and an outer circumferential surface of the stator core 21.

The refrigerant supply flow path RF includes a main flow path MF and branched flow paths BF.

The main flow path MF extends in the circumferential direction of the stator core 21 and communicates with the refrigerant supply hole 13a.

Accordingly, refrigerant introduced into the refrigerant supply hole 13a moves in the circumferential direction through the main flow path MF between the stator core 21 and the inner circumferential surface of the main portion 12.

The branched flow paths BF extend in an axial direction from both sides of the main flow path MF.

Specifically, the branched flow paths BF are formed to extend from both sides of the main flow path MF to the front side and the rear side, respectively, and the branched flow paths BF may be formed in plural in the circumferential direction of the stator core 21. The plurality of branched flow paths BF is disposed to be spaced apart from each other by a predetermined distance in the circumferential direction.

Further, the branched flow paths BF communicate with the main flow path MF.

Accordingly, refrigerant flowing through the main flow path MF is introduced into the branched flow paths BF, moved to the first accommodation space V11 and the second accommodation space V12 through the branched flow path BF, and then be discharged.

The inner circumferential surface of the main portion 12 facing the outer circumferential surface of the stator core 21 is provided with a refrigerant supply groove 123 forming a refrigerant supply flow path RF recessed therein.

The refrigerant supply flow path RF is formed in a space between the refrigerant supply groove 123 and the outer circumferential surface of the stator core 21 facing the refrigerant supply groove 123.

The refrigerant supply groove 123 includes the main groove 124 and the branched grooves 125 and 126.

The main groove 124 extends in the circumferential direction of the stator core 21 and is connected to the refrigerant supply hole 13a.

The main flow path MF is formed in a space between the main groove 124 and the outer circumferential surface of the stator core 21 facing the main groove 124.

The branched grooves 125 and 126 include a first branched groove 125 and a second branched groove 126.

The first branched groove 125 is connected to a front side of the main groove 124 and extends to a front side in the axial direction. The second branched groove 126 is connected to a rear side of the main groove 124 and extends to a rear side in the axial direction.

The branched flow paths BF are formed in a space between the first and second branched grooves 125 and 126 and the outer circumferential surface of the stator core 21 facing the first and second branched grooves 125 and 126.

The main groove 124 has a predetermined width W1 in the axial direction. In addition, the first and second branched grooves 125 and 126 have a predetermined length D1 in the axial direction.

A value W1+D1+D1 obtained by adding a value W1 of an axial width of the main groove 124 to a sum D1+D1 of the axial lengths of the first and second branched grooves 125 and 126 is greater than a value of the axial length of the stator core 21.

An end portion of the first branched groove 125 faces the first accommodation space V11 rather than the outer circumferential surface of the stator core 21, and an end portion of the second branched groove 126 faces the second accommodation space V12 rather than the outer circumferential surface of the stator core 21.

Accordingly, refrigerant transferred through the branched flow paths BF can be transferred from each of the end portions of the first branched groove 125 and the second branched groove 126, then be discharged to the first accommodation space V11 and the second accommodation space V12, respectively.

A first coupling groove 121 and a second coupling groove 122 are formed at both sides of the inner circumferential surface of the main portion 12 into which the stator core 21 is press-fitted.

The first coupling groove 121 is formed to be recessed at a front side of the main portion 12, and the second coupling groove 122 is formed to be recessed at a rear side of the main portion 12.

The first coupling groove 121 is formed at the front side of the main portion 12 in the circumferential direction with a predetermined length in the axial direction. In addition, the second coupling groove 122 is formed at the rear side of the main portion 12 in the circumferential direction with a predetermined length in the axial direction. The predetermined lengths may be lengths respectively corresponding to a first protrusion coupling portion 181 of the first cover 18 and a second protrusion coupling portion 191 of the second cover 19 to be described later.

Portions where the first and second coupling grooves 121 and 122 are formed in the main portion 12 have a radial thickness thinner than other portions.

The first cover 18 and the second cover 19 are formed to cover both open sides of the main housing 11. The first cover 18 and the second cover 19 are formed in a shape in which a square is coupled to a lower side of a circle.

However, the shape is not limited thereto, and in an embodiment not illustrated, the first cover 18 and the second cover 19 may be formed in various shapes having a size capable of covering both open sides of the main housing 11.

The first protruding coupling portion 181 is formed to protrude by a predetermined length from a rear side surface of the first cover 18. The predetermined length is equal to an axial length of the first coupling groove 121.

The first protruding coupling portion 181 is formed in a shape to be engaged with the first coupling groove 121 of the main portion 12. Accordingly, when the first protruding coupling portion 181 is inserted into the open front side of the main portion 12, an outer circumferential surface of the first protruding coupling portion 181 and the first coupling groove 121 are engaged with each other. Accordingly, the first cover 18 and the front side of the main housing 11 can be coupled to each other.

The second protruding coupling portion 191 is formed to protrude by a predetermined length from a front side surface of the second cover 19. The predetermined length is equal to an axial length of the second coupling groove 122.

The second protruding coupling portion 191 is formed in a shape to be engaged with the second coupling groove 122 of the main portion 12. Accordingly, when the second protruding coupling portion 191 is inserted into the open rear side of the main portion 12, an outer circumferential surface of the second protruding coupling portion 191 and the second coupling groove 122 are engaged with each other. Accordingly, the second cover 19 and the rear side of the main housing 11 can be coupled to each other.

Although not illustrated, the first cover 18 and a front end of the main housing 11 may have a sealing portion (not illustrated) at a portion where the first cover 18 and the front end of the main housing 11 are brought into contact with each other. In addition, the second cover 19 and a rear end of the main housing 11 may have a sealing portion (not illustrated) at a portion where the second cover 19 and the rear end of the main housing 11 are brought into contact with each other. Accordingly, leakage of refrigerant through a portion where the first cover 18 and the main housing 11 are coupled to each other and a portion where the second cover 19 and the main housing 11 are coupled to each other can be suppressed.

A first shaft bearing portion 182 and a first shaft bearing hole 182a are formed in the first cover 18, and a second shaft bearing portion 192 and a second shaft bearing hole 192a are formed in the second cover 19.

A front side of a shaft 32 to be described later is accommodated in the first shaft bearing hole 182a, and a rear side of the shaft 32 is accommodated in the second shaft bearing hole 192a.

As described above, the stator core 21 is coupled to the inner circumferential surface of the main portion 12, and the stator coils 22 are wound around the stator core 21.

The stator core 21 and the stator coils 22 constitute the stator 20.

Figure 3:
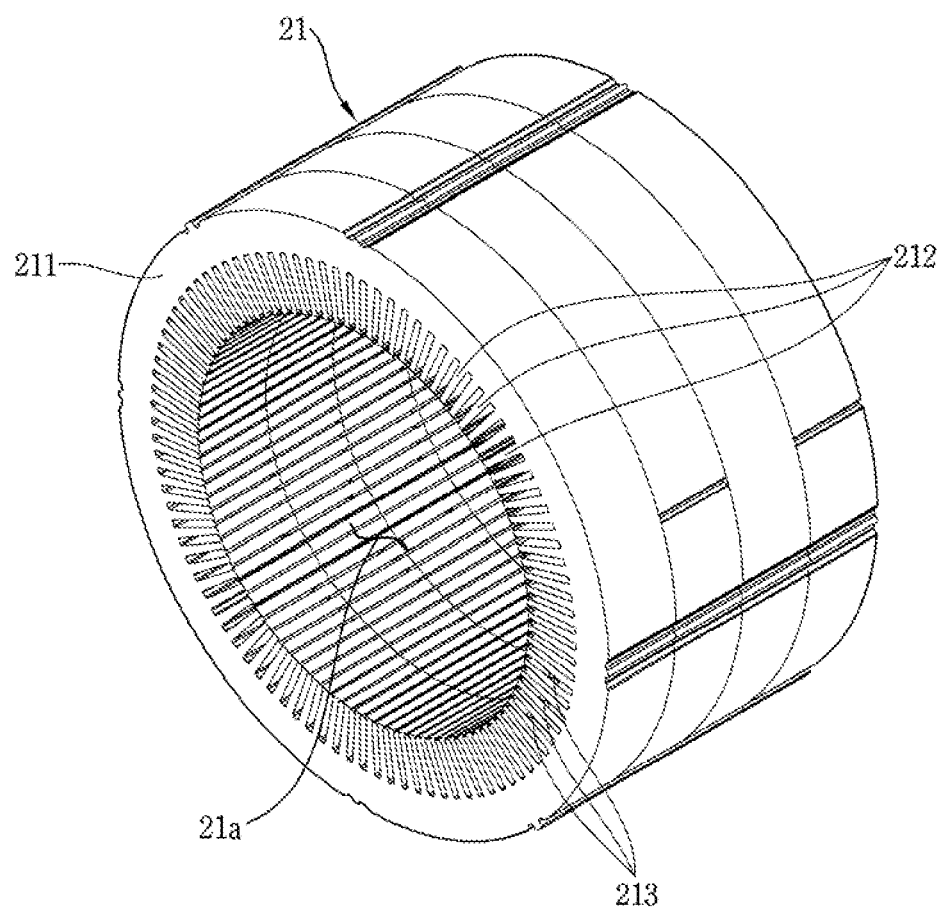
FIG. 3 is a perspective view illustrating a stator core according to FIG. 1.

In the following, the stator 20 and the rotor 30 will be described with reference to FIGS. 3 and 4.

(2) Description of the Stator 20

A magnetic field to rotate the rotor 30 to be described later is formed in the stator 20.

The stator 20 includes the stator core 21 and the stator coils 22 wound around the stator core 21.

The stator core 21 includes a yoke portion 211 formed in an annular shape and a plurality of teeth portions 212 protruding radially inward from an inner circumferential surface of the yoke portion 211.

The stator core 21 is formed to extend by a predetermined length in the axial direction.

In addition, the stator core 21 may be formed by stacking a plurality of electrical sheets having a predetermined thickness in the axial direction in an insulated manner. Accordingly, an occurrence of iron loss when the motor 1 is operated can be suppressed.

The teeth portions 212 are disposed to be spaced apart from each other in the circumferential direction inside the yoke portion 211, and a slot 213 which is a predetermined space is formed between the teeth portions 212 adjacent to each other in the circumferential direction.

That is, the slot 213 is formed in plural, and the plurality of teeth portions 212 and the plurality of slots 213 are alternately disposed in the circumferential direction.

The stator coils 22 may be wound around the plurality of teeth portions 212 and the plurality of slots 213 in a predetermined pattern.

The stator coil 22 includes a conductor and an insulated coating surrounding the conductor. As the stator coil 22, a conductor segment or a hairpin magnet wire (hereinafter referred to as "hairpin") formed by bending a flat-angled copper wire (refer to FIG. 5) with a relatively large cross-sectional area into an approximately "U" shape is used.

The stator coils 22 are electrically connected by inserting the 1o stator coils 22 into the plurality of slots 213 in a predetermined pattern in one direction, and then welding ends of the stator coils 22 protruding toward one side of the stator core 21 in a predetermined pattern.

Accordingly, an end turn portion at which bent portions of the stator coils 22 are positioned is formed at one side of the stator core 21, and a crown portion at which end portions of the stator coils 22 are electrically coupled is formed at another side of the stator core 21.

When the motor 1 is operated, relatively more heat is generated at the end turn portion and the crown portion than other portions. Therefore, it is preferable that refrigerant is smoothly sprayed onto both sides of the stator core 21 at which the end turn portion and the crown portion are formed.

In one embodiment, a stranded wire may be used as the stator coil 22. Here, the stator coils 22 pass through the plurality of slots 213 in the axial direction and are wound around the plurality of teeth portions 212 in a predetermined pattern.

In an embodiment not illustrated, the stator coils 22 are electrically connected to an inverter (not illustrated). And the inverter (not illustrated) converts power applied from an external power source into alternative current power for operating the motor 1, then supplies the alternative current power to the stator coils 22.

As a current is applied from the inverter (not illustrated) to the stator coils 22, a magnetic field is formed around the stator coils 22. That is, a rotating magnetic field to rotate the rotor 30 is formed in the stator 20.

A rotor accommodation hole 21a is formed through a radially inner side of the plurality of teeth portions 212, and the rotor 30 is rotatably disposed in the rotor accommodation hole 21a.

The rotor 30 is rotated by an interaction with the rotating magnetic field of the stator 20.

(3) Description of the Rotor 30

The rotor 30 includes a rotor core 31 and the shaft 32.

The rotor core 31 is formed to extend by a predetermined length in the axial direction.

The rotor core 31 may be formed in an annular column shape with a shaft accommodation hole 31a formed therethrough in a central portion of the rotor core 31.

In addition, the rotor core 31 may be formed by stacking a plurality of electrical sheets having a predetermined thickness in the axial direction in an insulated manner. Accordingly, an occurrence of iron loss when the motor 1 is operated can be suppressed.

In an embodiment not illustrated, the rotor core 31 may include a permanent magnet (not illustrated). In this case, a rotating magnetic field of the stator 20 and a magnetic field of the permanent magnet (not illustrated) interact with each other. Accordingly, the rotor 30 can be rotated relative to the stator 20.

The shaft 32 is inserted into the shaft accommodation hole 31a. In one embodiment, the shaft accommodation hole 31a and the shaft 32 may be coupled to each other in a press-fitting manner.

The shaft 32 protrudes in the axial direction to both sides of the rotor core 31, the front side of the shaft 32 is accommodated in the first shaft bearing hole 182a, and the rear side of the shaft 32 is accommodated in the second shaft bearing hole 192a.

That is, electrical energy is supplied to the stator 20, and the electrical energy is converted into mechanical rotational energy by the interaction of the magnetic field formed in the stator 20 and the magnetic field formed in the rotor 30.

Hereinafter, a refrigerant circulation process through the main flow path MF and the branched flow paths BF will be described with reference to FIGS. 4 and 5.

(4) Description of the Refrigerant Circulation Process

Refrigerant introduced through the refrigerant supply hole 13a is introduced into the main flow path MF, moves through the main flow path MF to be introduced into the branched flow paths BF, then be discharged into the first accommodation space V11 and the second accommodation space V12.

Refrigerant is discharged into the first accommodation space V11 through the branched flow paths BF formed in the axial direction at a front side of the main flow path MF, and is discharged into the second accommodation space V12 through the branched flow paths BF formed in the axial direction at a rear side of the main flow path MF.

Figure 4:
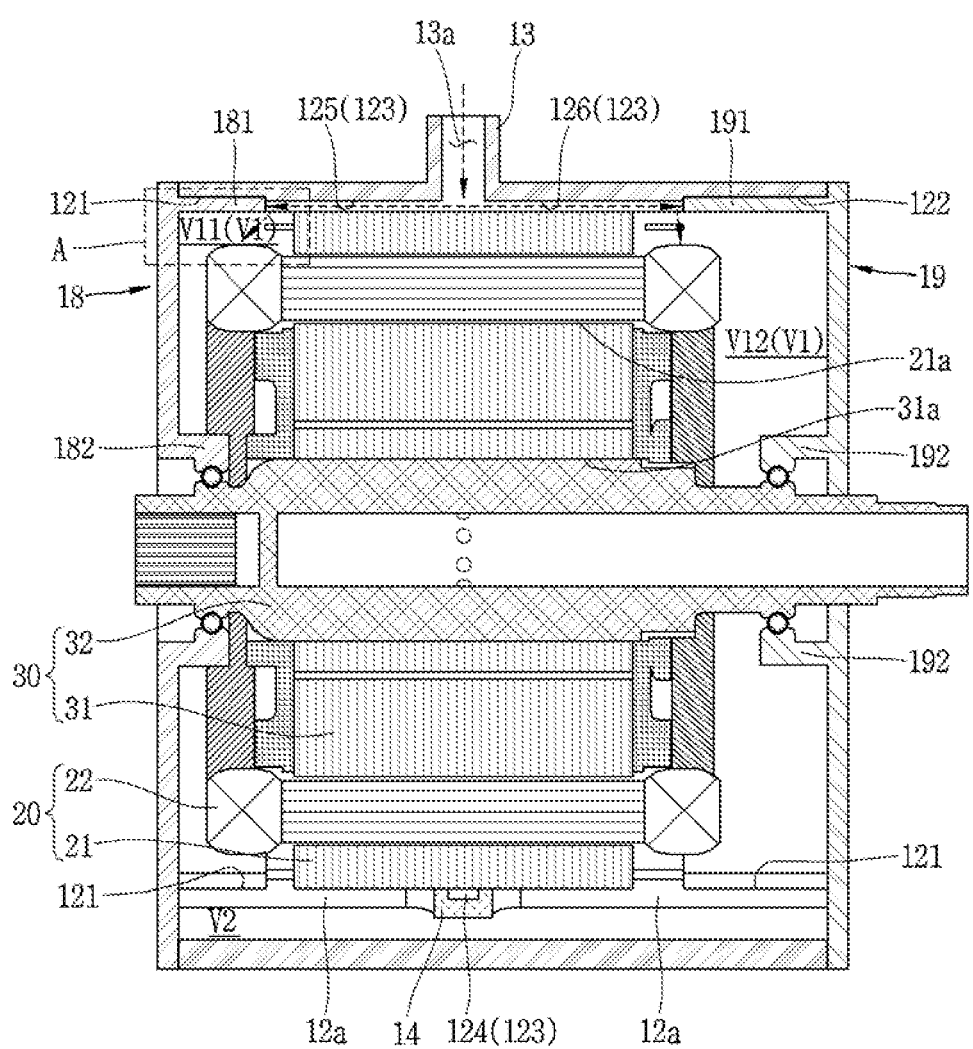
FIG. 4 is a cross-sectional view illustrating the motor according to FIG. 1 taken along line IV-IV.

Referring to FIG. 4, in a state in which the stator core 21 is press-fitted, branched flow paths BF are formed between the outer circumferential surface of the stator core 21 and the first branched groove 125 and between the outer circumferential surface and the second branched groove 126.

Refrigerant discharged to the first accommodation space V11 through the branched flow paths BF is sprayed on a front side of the stator 20 and the rotor core 31.

The refrigerant sprayed on the front side of the stator 20 and the rotor core 31 exchanges heat with the stator 20 and the rotor core 31. Heat energy is transferred from the stator 20 and the rotor core 31 having a relatively high temperature to the refrigerant having a relatively low temperature.

In addition, refrigerant discharged to the second accommodation space V12 through the branched flow paths BF is sprayed on a rear side of the stator 20 and the rotor core 31.

The refrigerant sprayed on the rear side of the stator 20 and the rotor core 31 exchanges heat with the stator 20 and the rotor core 31. Heat energy is transferred from the stator 20 and the rotor core 31 having a relatively high temperature to the refrigerant having a relatively low temperature.

Therefore, the stator 20 and the rotor core 31 heated while the motor 1 is operating can be cooled.

A portion where the stator coils 22 are bent or electrically coupled may be formed to protrude at a front end portion and a rear end portion of the stator 20.

In one embodiment, when a flat-angled copper wire is used as the stator coil 22, an end turn portion at which the stator coils 22 are bent may be formed at the front end portion and the rear end portion of the stator 20, and a crown portion at which the stator coils 22 are electrically coupled to each other may be formed at the rear end portion of the stator core 21.

In one embodiment, when a stranded wire is used as the stator coil 22, a portion where the stator coils 22 are bent and wound around the teeth portions 212 may be formed at the front end portion and the rear end portion of the stator 20.

When the motor 1 is operating, a portion where the stator coils 22 are bent or electrically coupled may generate relatively more heat energy than other portions. That is, a portion where the stator coils 22 are bent or electrically coupled is one of main heat sources of the motor 1.

The refrigerant discharged into the first accommodation space V11 may be sprayed onto the stator coils 22 protruding from a front end portion of the stator core 21. In addition, the refrigerant discharged into the second accommodation space V12 may be sprayed onto the stator coils 22 protruding from the rear end portion of the stator core 21.

Therefore, the portion where the stator coils 22 are bent or electrically coupled which is one of the main heat sources of the motor 1 can be cooled.

Figure 5:
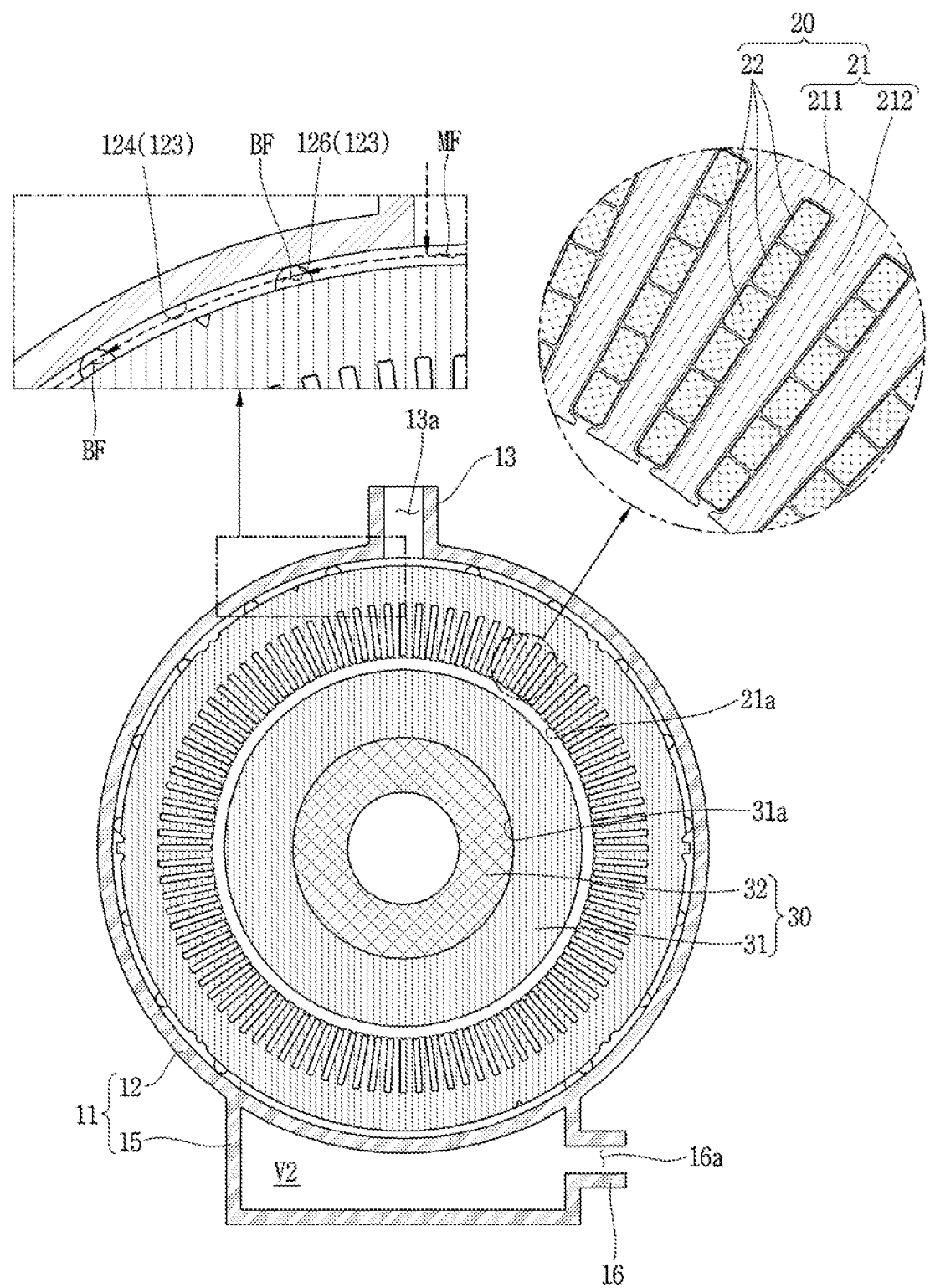
FIG. 5 is a cross-sectional view illustrating the motor according to FIG. 1 taken along line V-V.

Referring to FIG. 5, refrigerant flowing through the main flow path MF is distributed to the branched flow paths BF.

In a state in which the stator core 21 is press-fitted, the main flow path MF is formed between the outer circumferential surface of the stator core 21 and the main groove 124.

The main flow path MF surrounds the stator core 21 in the circumferential direction of the stator core 21.

The plurality of branched flow paths BF is disposed to be spaced apart from each other in the circumferential direction of the stator core 21, and each of the branched flow paths BF is electrically connected to the main flow path MF.

Accordingly, refrigerant flowing through the main flow path MF may flow into each of the branched flow paths BF.

Since the plurality of branched flow paths BF are arranged to be spaced apart from each other in the circumferential direction, an excessive amount of refrigerant being supplied to a specific portion of the stator 20 and the rotor core 31 thereby spraying an insufficient amount of refrigerant to another specific portion can be suppressed.

That is, each end portion of the stator 20 and the rotor core 31 can be evenly cooled in the circumferential direction.

The refrigerant discharged to the first accommodation space V11 and the second accommodation space V12 through the branched flow paths BF cools the stator 20 and the rotor 30, and then is introduced into refrigerant storage space V2 through the through holes 12a.

The refrigerant introduced into the refrigerant storage space V2 is discharged outside the motor 1 through the refrigerant discharge hole 16a, and then cooled again in the process of flowing through the refrigerant circulation portion (not illustrated) to be introduced into the main flow path MF through the refrigerant supply hole 13a.

3. Description of the Effect of the Structure in which the Refrigerant Supply Groove 123 is Formed on the Inner Circumferential Surface of the Housing 10

The main groove 124 forming the main flow path MF and the branched grooves 125 and 126 forming the branched flow paths BF are recessed in the inner circumferential surface of the housing.

Therefore, without separately processing the stator core 21 to form a flow path in the stator core 21 or adding a separate component for distributing refrigerant to the stator core 21, refrigerant can be smoothly supplied to both end portions of the stator core 21.

When a flow path is formed in the stator core 21, a magnetic path area is reduced so that an output of the motor 1 may be adversely affected, and a size of the stator core 21 may be increased.

In addition, when a separate component for distributing refrigerant is added to the stator core 21, a cost for producing the separate component may be added and an assembly process of the motor 1 may be complicated. That is, the cost for producing the motor 1 may be increased.

As the refrigerant supply groove 123 is formed on the inner circumferential surface of the housing 10, refrigerant can be smoothly supplied to both end portions of the stator core 21 without reducing the magnetic path area of the stator core 21, increasing the size, or increasing the manufacturing cost.

In other words, while refrigerant is smoothly supplied to both end portions of the stator core 21, the motor 1 is miniaturized and the assembly process of the motor 1 is simplified, so that the manufacturing cost of the motor can be reduced.

4. Description of a Modified Embodiment of the Main Flow Path MF

Figure 6:
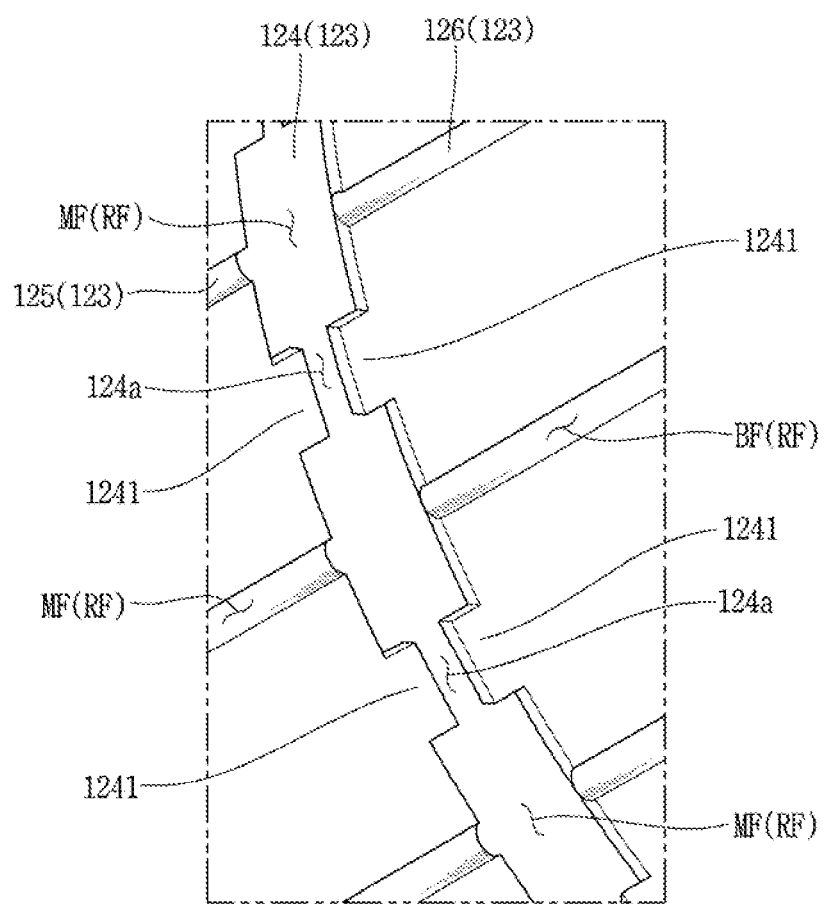
FIG. 6 is a partial perspective view illustrating another embodiment of the housing according to FIG. 2.

Hereinafter, a modified embodiment of the main flow path MF will be described with reference to FIG. 6.

A portion in the main groove 124, where branched grooves 125 and 126 adjacent to each other are connected in the circumferential direction, is provided with a bottleneck portion 124a having a narrower width.

The bottleneck portion 124a may be defined as a space between bottleneck protrusions 1241 protruding from both side surfaces of the main groove 124 facing each other.

An axial width W2 between the bottleneck protrusions 1241 is formed to be narrower than an axial width W1 of the main groove 124.

In the illustrated embodiment, the bottleneck protrusion 1241 protrudes in a shape of a square pillar.

However, the shape is not limited thereto, and in an embodiment not illustrated, the bottleneck protrusions 1241 may be formed in various shapes. For example, the bottleneck protrusions 1241 may be formed to protrude convexly toward each other from both side surfaces of the main groove 124 facing each other.

Since a cross-sectional area of the flow path is instantly reduced while refrigerant flowing through the main flow path MF flows into the bottleneck portion 124a, a pressure of the refrigerant can be momentarily increased.

Since a pressure difference between the main flow path MF and the branched flow path BF is instantly increased, refrigerant can be more smoothly introduced into the branched flow path BF from the main flow path MF.

That is, without increasing the pressure of the refrigerant introduced through the refrigerant supply hole 13a, a flow rate at which the refrigerant is discharged through the branched flow path BF can be increased by a simple structural change.

As a result, refrigerant can be more smoothly discharged into the first accommodation space V11 and the second accommodation space V12.

5. Description of the Structure in which Refrigerant is Sprayed Toward the Shaft 32

Next, with reference to FIGS. 7 to 9, a structure in which refrigerant that has passed through the branched flow path BF is sprayed to a center of the shaft 32 will be described.

Figure 7:
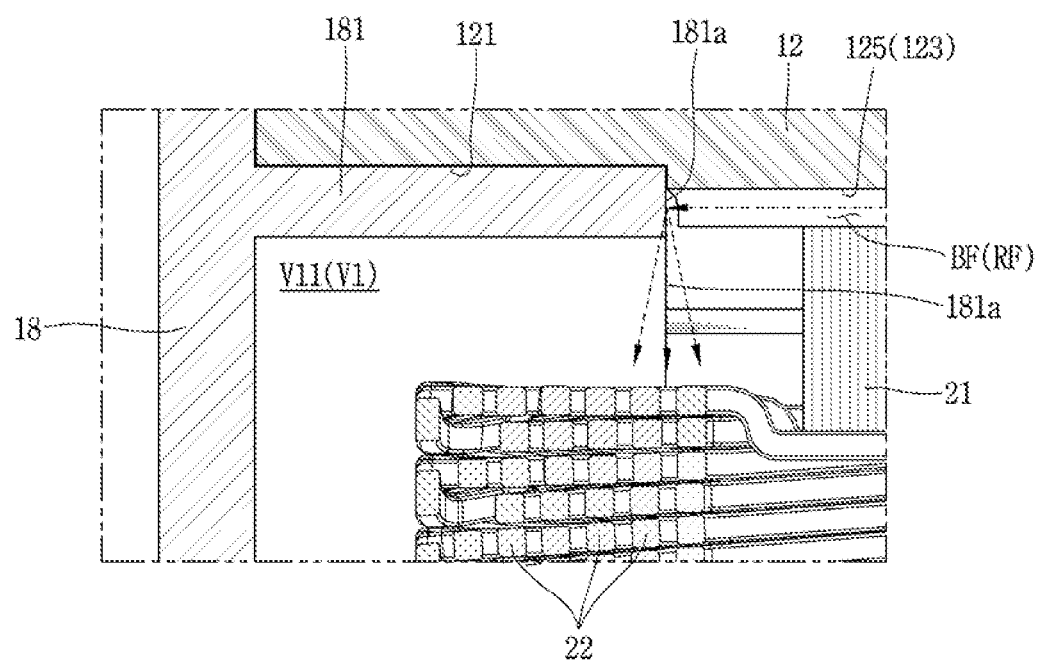
FIG. 7 is an enlarged partial cross-sectional view illustrating an area A of FIG. 4.

Referring to FIG. 7, refrigerant dispersion surfaces 181a are formed on the inner circumferential surface of the housing 10, and the refrigerant dispersion surfaces 181a are disposed at end portions of the branched grooves 125 and 126.

The refrigerant dispersion surfaces 181a are formed in plural and are disposed at each of end portions of the plurality of branched grooves 125 and 126. That is, the plurality of refrigerant dispersion surfaces 181a is disposed to be spaced apart from each other in the circumferential direction of the stator core 21.

Refrigerant moved through the branched flow paths BF collides with each of the refrigerant dispersion surfaces 181a and then is sprayed toward the stator coils 22 protruding from both end portions of the stator core 21.

The refrigerant dispersion surfaces 181a are formed to be inclined in a direction crossing the axial direction. In an embodiment, the refrigerant dispersion surfaces 181a may be formed perpendicular to the axial direction.

As a result, refrigerant colliding with the refrigerant dispersion surfaces 181a may be sprayed toward the shaft 32.

Since the refrigerant discharged from the branched flow paths BF located at a lower side of the motor 1, based on a direction in which the motor 1 is installed, is affected by gravity, an amount of refrigerant reaching the stator coils 22 located at an upper side of the motor 1 may be reduced.

Accordingly, an efficiency of cooling the stator coils 22 located at the lower side of the motor 1 may be reduced.

However, since the refrigerant dispersion surfaces 181*a* are formed inclined in the direction crossing the axial direction, refrigerant colliding with the refrigerant dispersion surfaces 181*a* can be sprayed upwardly toward the center of the shaft 32. Accordingly, the refrigerant can be sufficiently sprayed onto the stator coils 22 located at the lower side.

As a result, the stator coils 22 located at the upper side and the lower side can be cooled evenly.

In the illustrated embodiment, the refrigerant dispersion surfaces 181*a* are formed at an end portion of the first protruding coupling portion 181 and an end portion of the second protruding coupling portion 191.

When the first cover 18 is inserted into an open front side of the main housing 11, a rear end surface of the first protruding coupling portion 181 is disposed to face the end portion of the first branched groove 125.

As a result, refrigerant moved through the first branched groove 125 collides with the rear end surface of the first protruding coupling portion 181. That is, refrigerant collides with the refrigerant dispersion surface 181*a* formed at the end portion of the first protruding coupling portion 181 to be sprayed toward the center of the shaft 32.

When the second cover 19 is inserted into an open rear side of the main housing 11, a front end surface of the second protruding coupling portion 191 is disposed to face an end portion of the second branched groove 126.

As a result, refrigerant moved through the second branched groove 126 collides with the front end surface of the second protruding coupling portion 191. That is, refrigerant collides with the refrigerant dispersion surface (not shown) formed at the end portion of the second protruding coupling portion 191 to be sprayed toward the center of the shaft 32.

In order to increase a dispersion effect of refrigerant, the first protruding coupling portion 181 and the second protruding coupling portion 191 may be formed to protrude radially inward from a portion of the housing 10 at which the refrigerant supply groove 123 is formed. That is, in a coupled state, there is a step difference between the first and second protruding coupling portions 181 and 191 and the main housing 11.

Figure 8:
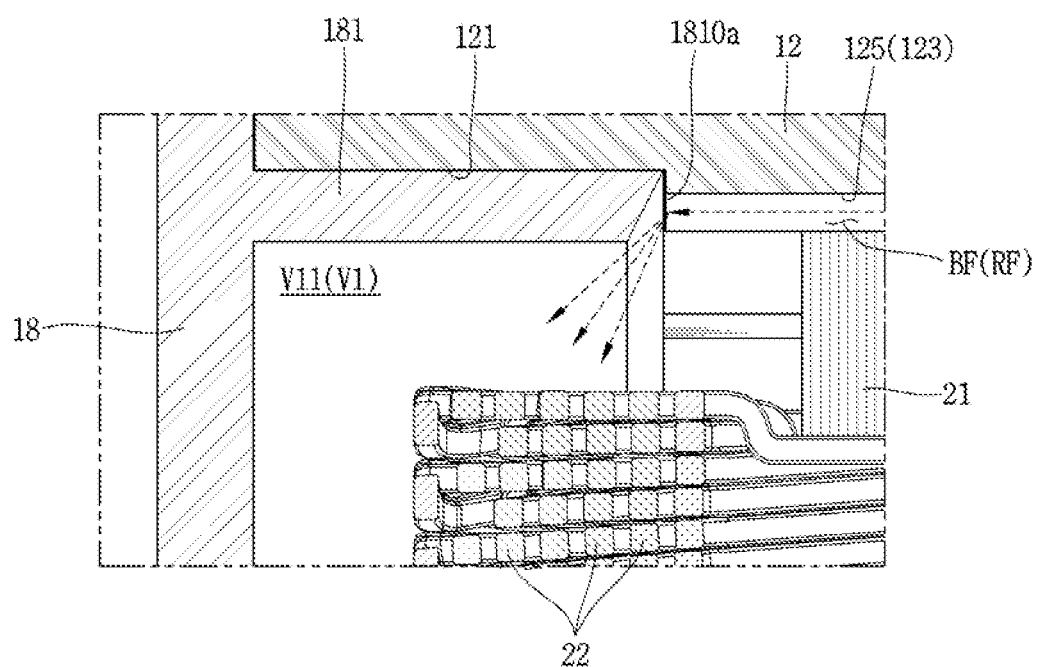
FIG. 8 is a partial cross-sectional view illustrating another embodiment of the motor according to FIG. 7.

Referring to FIG. 8, a modified embodiment of the refrigerant dispersion surface 181*a* is illustrated. A refrigerant dispersion surface 1810*a* according to the modified embodiment may be formed inclined in a direction away from the main groove 124.

The inclined refrigerant dispersion surface 1810*a* may be formed by chamfering a corner forming an inner circumference of an end portion of the first protruding coupling portion 181 in the circumferential direction.

In addition, the refrigerant dispersion surface (not shown) may be formed by chamfering a corner forming an inner circumference of an end portion of the second protruding coupling portion 191 in the circumferential direction.

Accordingly, the inclined refrigerant dispersion surfaces 1810*a* may be disposed at the end portions of the first and second protruding coupling portions 181 and 191 facing each of the end portions of the branched grooves 125 and 126.

Refrigerant moved through the branched grooves 125 and 126 is moved through the inclined refrigerant dispersion surfaces 1810*a* to be sprayed toward the center of the shaft 32.

Thereby, refrigerant can be sprayed farther from each of the end portions of the stator core 21.

Specifically, refrigerant can be sprayed farther from the front end portion of the stator core 21, and refrigerant can be sprayed farther from the rear end portion of the stator core 21.

Depending on a type or winding method of the stator coils 22, a length of the stator coils 22 protruding from each of the end portions of the stator core 21 may be changed.

In a case the protruding length of the stator coils 22 is relatively long, refrigerant may reach farther in the axial direction when a slope of the refrigerant dispersion surface 181*a* is formed more smoothly. Accordingly, refrigerant can be sprayed all over the stator coils 22.

When the protruding length of the stator coils 22 is relatively short, it is preferable to form the slop of the refrigerant dispersion surface 181*a* more abruptly or vertically.

Figure 9:
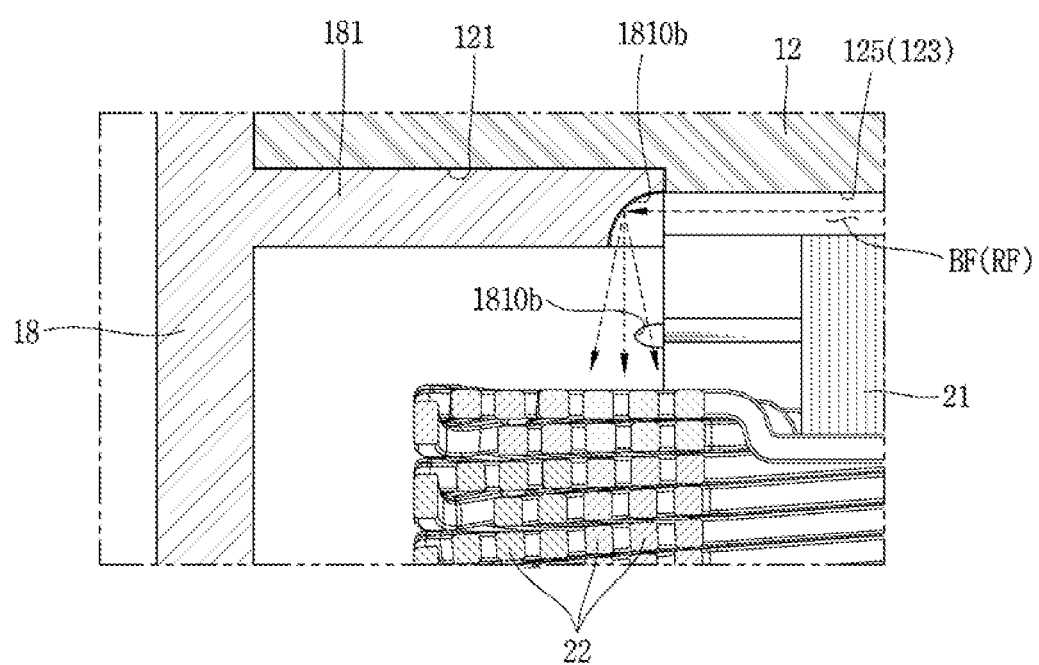
FIG. 9 is a partial cross-sectional view illustrating still another embodiment of the motor according to FIG. 7.

Referring to FIG. 9, another modified embodiment of the refrigerant dispersion surface 181*a* is illustrated. An end portion of the first protruding coupling portion 181 according to the modified embodiment may be provided with refrigerant dispersion grooves 1810*b* each formed recessed.

The refrigerant dispersion grooves 1810*b* are formed at positions corresponding to each of the end portions of the first branched grooves 125.

The refrigerant dispersion grooves 1810*b* may be formed in a quarter-sphere shape each opened toward the first branched groove 125 and the shaft 32.

Accordingly, refrigerant moved through the first branched groove 125 may be moved through the curved surface of the refrigerant dispersion groove 1810*b* to be intensively sprayed toward the center of the shaft 32.

That is, refrigerant can be intensively sprayed to a specific portion rather than being sprayed over a larger area.

When the stator coils 22 protruding toward the front side of the stator core 21 are densely disposed at a specific portion, a cooling effect can be improved by intensively spraying refrigerant to the specific portion.

In addition, an end portion of the second protruding coupling portion 191 according to the modified embodiment may be provided with refrigerant dispersion grooves (not shown) each formed recessed.

The refrigerant dispersion grooves (not shown) are formed at positions corresponding to each of the end portions of the second branched grooves 126.

The refrigerant dispersion grooves (not shown) may be formed in a quarter-sphere shape each opened toward the second branched groove 126 and the shaft 32.

Accordingly, the refrigerant moved through the second branched groove 126 may be moved through the curved surface of the refrigerant dispersion groove (not shown) to be intensively sprayed toward the center of the shaft 32.

That is, the refrigerant can be intensively sprayed to a specific portion rather than being sprayed over a larger area.

When the stator coils 22 protruding toward the rear side of the stator core 21 are densely disposed at a specific portion, a cooling effect can be improved by intensively spraying the refrigerant to the specific portion.

The foregoing description has been given of three embodiments, as a structure for spraying refrigerant toward the center of the shaft 32. The refrigerant dispersion surfaces 181*a* and 1810*a* and the refrigerant dispersion grooves 1810*b* described above may be used in combination in one embodiment.

For example, the refrigerant dispersion surfaces 181*a* and 1810*a* may be formed at an upper side, based on the direction in which the motor 1 is installed, and the refrigerant dispersion grooves 1810b may be formed at a lower side. By forming the refrigerant dispersion grooves 1810b at the lower side, a distance in which refrigerant sprayed upwardly from the lower side may be increased.

Accordingly, refrigerant can be sprayed over a wider range at the upper side, and refrigerant can smoothly reach the stator coils 22 at the lower side.

Summarizing the above-described effects, refrigerant moved through the axial flow paths may collide with the refrigerant dispersion structure to be sprayed toward the center of the shaft 32.

Accordingly, refrigerant can be sprayed toward the crown portion and the end turn of the stator coils 22 located at both end portions of the stator core 21.

Therefore, areas of portions of outer circumferential surfaces of the crown portion and the end turn in contact with the sprayed refrigerant may be increased.

As a result, heat exchange between the stator coils 22 and refrigerant can be performed more smoothly.

Although the foregoing description has been given with reference to the preferred embodiment, it will be understood that those skilled in the art will be able to variously modify and change the present disclosure without departing from the scope of the disclosure described in the claims below.

What is claimed is:

1. A motor, comprising:
    a housing comprising an accommodation space and a refrigerant supply hole formed in a radial direction through an outer circumferential surface of the housing;
    a stator core disposed in the accommodation space and coupled to an inner circumferential surface of the housing;
    stator coils wound around the stator core;
    a rotor core rotatably disposed in the accommodation space and spaced apart from an inner circumferential surface of the stator core by a predetermined distance;
    a shaft coupled to a central portion of the rotor core; and
    a refrigerant supply groove formed as a recess in a portion of the inner circumferential surface of the housing adjacent to a location where the inner circumferential surface of the housing is coupled to the stator core, the refrigerant supply groove comprising:
        a main groove configured to communicate with the refrigerant supply hole and extending in a circumferential direction of the stator core; and
        a plurality of branched grooves extending in an axial direction from both sides of the main groove,
    wherein the branched grooves are formed in the axial direction of the stator core,
    wherein the main groove has a predetermined width in the axial direction, and
    wherein the main groove comprises a portion in which the branched grooves are connected in the axial direction, the portion comprising a bottleneck portion having a narrower width.

2. The motor of claim 1, wherein the main groove and the inner circumferential surface of the housing form a main flow path configured to allow a flow of refrigerant introduced through the refrigerant supply hole, and
    wherein the branched grooves and the inner circumferential surface of the housing form branched flow paths configured to allow the refrigerant from the main flow path to flow on both sides of the main groove in the axial direction of the stator core.

3. The motor of claim 1, wherein the main groove and the inner circumferential surface of the housing form a main flow path configured to allow a flow of refrigerant introduced through the refrigerant supply hole,
    wherein portions of the branched grooves overlapping the inner circumferential surface of the housing in a radial direction form branched flow paths together with the inner circumferential surface of the housing such that refrigerant flowing through the branched flow paths is discharged into the accommodation space through portions of the branched grooves that are open toward the accommodation space.

4. The motor of claim 1, wherein the branched grooves each have a predetermined length in the axial direction, such that a value obtained by adding a value of an axial width of the main groove to a sum of axial lengths of the branched grooves located on both sides of the main groove is greater than a value of an axial length of the stator core.

5. The motor of claim 1, wherein the inner circumferential surface of the housing comprises a plurality of refrigerant dispersion surfaces disposed at end portions of the branched grooves, and
    wherein the branched grooves overlap the refrigerant dispersion surfaces in the axial direction.

6. The motor of claim 5, wherein the refrigerant dispersion surfaces are formed to be inclined in a direction away from the main groove.

7. The motor of claim 5, wherein the housing comprises:
    a main housing having a first open side and a second open side; and
    covers coupled to the first and second open sides of the main housing, each of the covers comprising a protruding coupling portion protruding toward the main housing and configured to be engaged with an inner circumferential surface of n open portion of the main housing, and
    wherein the refrigerant dispersion surfaces are formed at end portions of the protruding coupling portions.

8. The motor of claim 1, wherein the inner circumferential surface of the housing comprises recessed refrigerant dispersion grooves connected to end portions of the branched grooves, and
    wherein each of the refrigerant dispersion grooves is formed in a shape comprising a quarter-sphere that is open toward the branched grooves and the shaft.

9. The motor of claim 8, wherein the housing comprises:
    a main housing having a first open side and a second open side; and
    covers coupled to the first and second open sides of the main housing, each of the covers comprising a protruding coupling portion protruding toward the main housing and configured to be engaged with an inner circumferential surface of n open portion of the main housing, and
    wherein the refrigerant dispersion grooves are formed at end portions of the protruding coupling portions.

10. The motor of claim 1, wherein the outer circumferential surface of the housing comprises a base portion protruding outwardly and comprising a refrigerant storage space in the base portion.

11. The motor of claim 10, wherein a portion of the housing facing the base portion is partially open toward the refrigerant storage space,
    wherein the refrigerant storage space and the accommodation space communicate with each other, and
    wherein the base portion further comprises a refrigerant discharge hole configured to discharge refrigerant introduced into the refrigerant storage space.

12. The motor of claim 10, wherein an axial length of the base portion is longer than the stator core, and
wherein the housing further comprises a plurality of through holes formed in a portion of the housing where the base portion is formed, the through holes being configured to allow communication between the refrigerant storage space and the accommodation space.

13. The motor of claim 12, wherein the plurality of through holes are disposed on first and second sides of the main groove.

14. The motor of claim 12, wherein the accommodation space comprises:
a first accommodation space disposed on one side of the stator core; and
a second accommodation space disposed on another side opposite to the one side of the stator core,
wherein a first through hole of the plurality of through holes is configured to allow fluid communication between the first accommodation space and the refrigerant storage space, and a second through hole of the plurality of through holes is configured to allow fluid communication between the second accommodation space and the refrigerant storage space, and
wherein a bridge portion forming a part of the main groove is disposed between the first and second through holes.

15. A motor, comprising:
a housing comprising an accommodation space and a refrigerant supply hole formed in a radial direction through an outer circumferential surface of the housing;
a stator core disposed in the accommodation space and coupled to an inner circumferential surface of the housing; and
a refrigerant supply flow path formed between the inner circumferential surface of the housing and the stator core, the refrigerant supply flow path comprising:
a main flow path configured to communicate with the refrigerant supply hole and extending in a circumferential direction of the stator core; and
branched flow paths extending in an axial direction from both sides of the main flow path,
wherein a recessed refrigerant supply groove is formed in a portion of the inner circumferential surface of the housing where the inner circumferential surface of the housing is coupled to the stator core, the refrigerant supply groove comprising:
a main groove configured to communicate with the refrigerant supply hole and extending in a circumferential direction of the stator core; and
a plurality of branched grooves extending in an axial direction from both sides of the main groove,
wherein the branched grooves are formed in the axial direction of the stator core,
wherein the main groove has a predetermined width in a lengthwise direction of the housing, and
wherein the main groove comprises a portion in which the branched grooves are connected in the axial direction, the portion comprising a bottleneck portion having a narrower width.

16. The motor of claim 15, wherein the main flow path is formed by the main groove and the inner circumferential surface of the housing, and
wherein the branched flow paths are formed by the branched grooves and the inner circumferential surface of the housing.

17. The motor of claim 15, wherein the branched grooves each have a predetermined length in the lengthwise direction of the housing, such that a value obtained by adding a value of a width of the main groove to a sum of the lengths of the branched grooves located at both sides of the main groove is greater than a value of a length of the stator core.

18. A motor, comprising:
a housing comprising an accommodation space and a refrigerant supply hole formed in a radial direction through an outer circumferential surface of the housing;
a stator core disposed in the accommodation space and coupled to an inner circumferential surface of the housing;
stator coils wound around the stator core;
a rotor core rotatably disposed in the accommodation space and spaced apart from an inner circumferential surface of the stator core by a predetermined distance;
a shaft coupled to a central portion of the rotor core; and
a refrigerant supply groove formed as a recess in a portion of the inner circumferential surface of the housing adjacent to a location where the inner circumferential surface of the housing is coupled to the stator core, the refrigerant supply groove comprising:
a main groove configured to communicate with the refrigerant supply hole and extending in a circumferential direction of the stator core; and
a plurality of branched grooves extending in an axial direction from both sides of the main groove,
wherein the inner circumferential surface of the housing comprises recessed refrigerant dispersion grooves connected to end portions of the branched grooves, and
wherein each of the refrigerant dispersion grooves is formed in a shape comprising a quarter-sphere that is open toward the branched grooves and the shaft.

* * * * *